(12) United States Patent
Motz

(10) Patent No.: US 12,460,949 B2
(45) Date of Patent: Nov. 4, 2025

(54) ANGLE SENSOR APPARATUS AND METHOD

(71) Applicant: Infineon Technologies AG, Neubiberg (DE)

(72) Inventor: Edwin Mario Motz, Wernberg (AT)

(73) Assignee: Infineon Technologies AG, Neubiberg (DE)

( * ) Notice: Subject to any disclaimer, the term of this patent is extended or adjusted under 35 U.S.C. 154(b) by 381 days.

(21) Appl. No.: 18/156,646

(22) Filed: Jan. 19, 2023

(65) Prior Publication Data

US 2023/0243673 A1 Aug. 3, 2023

(30) Foreign Application Priority Data

Feb. 1, 2022 (DE) .......................... 102022102337.0

(51) Int. Cl.
 *G01D 5/247* (2006.01)
 *G01P 3/48* (2006.01)

(52) U.S. Cl.
 CPC ............ *G01D 5/247* (2013.01); *G01P 3/4805* (2013.01)

(58) Field of Classification Search
 CPC ............ G01D 5/247; G01D 5/24; G01D 3/02; G01D 5/244; G01D 5/24485; G01D 5/2448; G01D 2205/20; G01P 3/4805; G01P 3/48; G01P 3/489; G01P 3/487; G01P 3/488; G01P 3/44; G01P 15/0802; G01B 7/30
 See application file for complete search history.

(56) References Cited

U.S. PATENT DOCUMENTS

| | | | |
|---|---|---|---|
| 4,734,655 A | 3/1988 | Kawai | |
| 2014/0365167 A1 | 12/2014 | Shimizu | |
| 2017/0131119 A1* | 5/2017 | Riedmueller | G01D 5/145 |
| 2018/0231400 A1* | 8/2018 | Okumura | G01D 5/2454 |
| 2018/0335441 A1* | 11/2018 | Hammerschmidt | G01P 3/488 |
| 2023/0124351 A1* | 4/2023 | Lutz | G01R 33/091 324/207.13 |

* cited by examiner

*Primary Examiner* — Son T Le
(74) *Attorney, Agent, or Firm* — Harrity & Harrity, LLP

(57) ABSTRACT

According to one example implementation, an angle sensor apparatus is provided, including: a sensor arrangement that is configured to respond to a rotational movement of a rotatable object by providing at least two phase-shifted measurement signals, an angle determination device that is configured to take the at least two phase-shifted measurement signals as a basis for determining an angular position, and a difference calculation device that is configured to determine a difference between the angular position determined by the angle determination device and an output from a counter, the counter being configured to be controlled based on the difference.

19 Claims, 6 Drawing Sheets

ANGLE SENSOR APPARATUS AND METHOD

CROSS-REFERENCE TO RELATED APPLICATION

This application claims priority to German Patent Application No. 102022102337.0 filed on Feb. 1, 2022, the content of which is incorporated by reference herein in its entirety.

TECHNICAL FIELD

The present application relates to angle sensor apparatuses and corresponding methods.

BACKGROUND

Angle sensor apparatuses are used to determine the angular position of a rotatable object. An example of this is automotive applications, where for example an angular position of a steering wheel, of a motor or of other shafts is determined. In addition to determining the absolute angular position, it is also possible to determine the rotational speed (angular velocity) as a derivative of the angular position based on time and also a corresponding angular acceleration as a second derivative of the angular position based on time. In the case of electric motors, for example, it is necessary to determine the absolute angular position in order to correctly supply a commutation of the current. The angular position is also referred to as the angle, the angular velocity as the velocity and the angular acceleration as the acceleration below for short.

One approach to measuring angular positions is to use magnetic field sensors, such as for example Hall sensors, or sensors based on magnetoresistive effects. This involves for example mounting a permanent magnet arrangement on a rotating object such as a shaft, which, on rotation, generates a modulated magnetic field, and detecting the magnetic field using magnetic field sensors. To determine the absolute angular position, many applications involve two or three magnetic field sensors being used, which are arranged in such a manner that they measure the magnetic field in a phase-shifted manner, for example in a manner shifted through 90° (cosine signal and sine signal), or in a manner shifted through 120°. Another type of sensors is inductive sensors, which involve a modulated current that represents the measurement signal being induced in measurement coils by the rotation of the rotatable object. These types of angle measurements are known to a person skilled in the art and are therefore not explained more specifically here.

Whereas comparatively slow sensors are used in this context for some applications, for example steering wheels, other applications, such as for example for determining angular positions and angular velocities of an electric motor, require a fast measurement at high resolution.

However, a high velocity and a high resolution with high accuracy are conflicting aims in some cases, since for example a high-resolution analog-to-digital converter for converting analog sensor outputs into digital signals for further processing has a higher latency than a converter with lower resolution. In some cases, fast changes in velocity (high acceleration or rapid deceleration) and also measurement inaccuracies due to noise are also problematic in the case of fast measurements such as these.

A conventional approach for high-velocity angle measurements uses Kalman filtering. This is limited to the update rate of analog-to-digital converters that are used, i.e. analog-to-digital converters having a high data rate are needed here. Another approach is to use methods based on phase locked loops (PLLs). These either only evaluate zero crossings of input signals from sensors and thereby lose information, or require relatively complex digital implementations.

One type of PLL-based method is so-called tracker loops, which are distinguished according to types II, III and IV. These can require relatively complicated multiplication operations.

There is therefore a need for improved angle sensor apparatuses and corresponding methods.

SUMMARY

An angle sensor apparatus according to claim 1 and a method according to claim 14 are provided. The subclaims define further implementations.

According to one example implementation, an angle sensor apparatus is provided, including:
a sensor arrangement that is configured to respond to a rotational movement of a rotatable object by providing at least two phase-shifted measurement signals,
an angle determination device that is configured to take the at least two phase-shifted measurement signals as a basis for determining an angular position, and
a difference calculation device that is configured to determine a difference between the angular position determined by the angle determination device and an output from a counter, the counter being configured to be controlled based on the difference.

According to a further example implementation, a method is provided, including:
detecting a rotational movement and generating at least two phase-shifted measurement signals in response to the rotational movement,
determining an angular position based on the at least two phase-shifted measurement signals,
calculating a difference between the angular position and an output from a counter, and
controlling the counter based on the difference.

The above summary merely provides a brief overview of some example implementations and should not be interpreted as restrictive, since other example implementations may have other features.

DETAILED DESCRIPTION

Various example implementations are explained in detail below. This description of detailed example implementations is used merely for illustrative purposes and should not be interpreted as restrictive. As such, a description of an example implementation having a multiplicity of features (components, elements, method steps, events and the like) should not be interpreted as meaning that all of these features are necessary for implementation. On the contrary, other example elements may have fewer features than the features and/or alternative features shown. In addition to the features shown, further features may be provided, for example features conventionally used in angle sensor apparatuses.

Connections or couplings relate to electrical connections or couplings unless indicated otherwise. Such connections or couplings can be modified, for example by adding or removing components, so long as the basic function of the connection or coupling, for example providing a signal, a voltage, a current, etc., is not substantially influenced. In other words, connections and couplings can be modified so long as their function is maintained.

Features of different example implementations can be combined in order to form further example implementations. Variations and modifications that are described for one of the example implementations can also be applied to other example implementations and are therefore not described repetitiously.

Sensors in this application are sensors that are ultimately used to detect a rotation angle, an angular velocity or an angular acceleration, i.e. their output changes based on an angular position of a rotatable object. As already mentioned by way of introduction, such sensors are known by themselves and may be for example magnetic field sensors such as Hall sensors or sensors based on magnetoresistive effects or inductively operating sensors.

Figure 1:
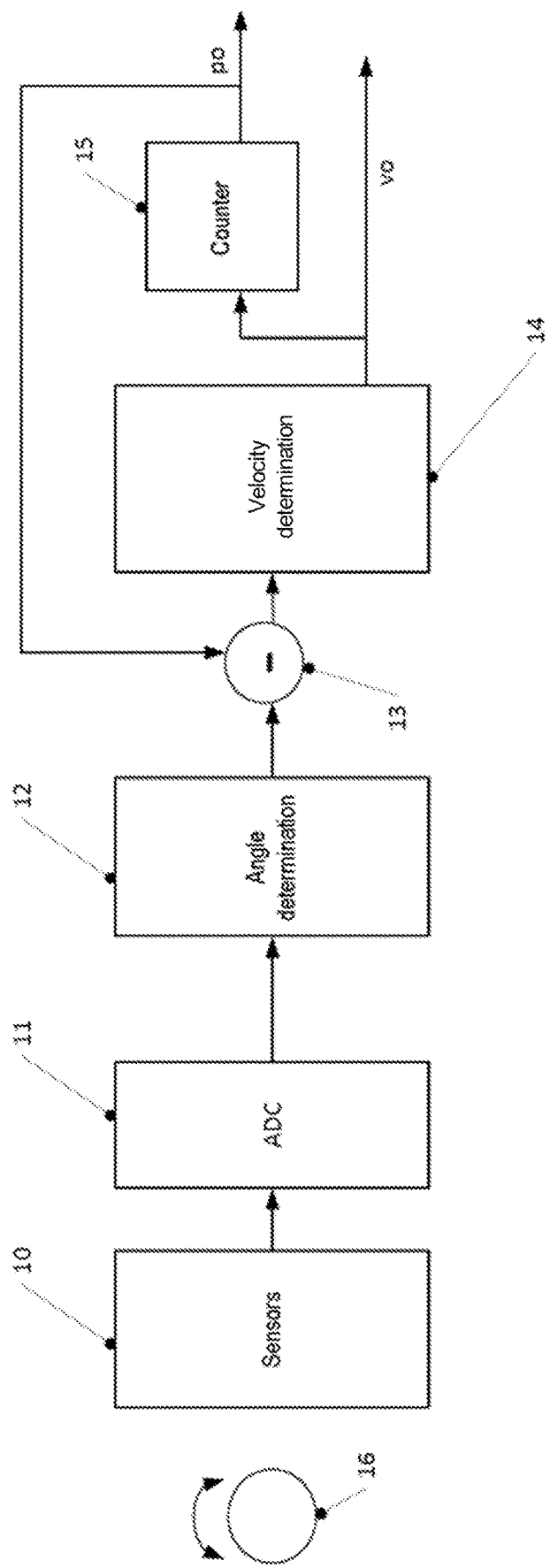
FIG. 1 shows a block diagram of an angle sensor apparatus according to one example implementation.

FIG. 1 shows a block diagram of an angle sensor according to one example implementation.

The angle sensor apparatus of FIG. 1 has a sensor device 10 that is configured to detect a rotational movement of a rotatable object 16 and to respond to the rotational movement by outputting at least two phase-shifted signals. By way of example, the sensor device 10 can comprise two magnetic field sensors, and the rotatable object 16 can comprise a magnetic ring, the two magnetic field sensors being arranged in such a manner that two measurement signals shifted through 90° are obtained on rotation of the rotatable object 16.

In other example implementations, three phase-shifted measurement signals can be used, which have then been shifted through 120°, for example. Such phase-shifted measurement signals can be used to unambiguously determine an angular position of the rotatable object 16. This is familiar to a person skilled in the art in itself and is therefore not explained more specifically here.

For the purpose of digital processing, the measurement signals in the example implementation of FIG. 1 are digitized by means of an analog-to-digital converter arrangement (ADC arrangement) 11. A dedicated analog-to-digital converter of the arrangement 11 may be provided for each of the measurement signals in this case. In other example implementations, a single analog-to-digital converter may also be used in conjunction with a multiplexer, in which case the analog-to-digital converter needs to have a correspondingly higher data rate in order to achieve the same data rate for the digitized measurement signals. In some example implementations, sigma-delta analog-to-digital converters can be used. However, other conventional types of analog-to-digital converter can also be used.

Based on the digitized signals that are output by the analog-to-digital converter arrangement 11, an angular position, referred to as angle for short, of the object 16 is then determined in an angle determination device 12. This can be done using conventional approaches, for example using a Cordic algorithm.

The components 12-15 downstream of the analog-to-digital converter arrangement 11 process digital signals and can be implemented in any conventional manner for digital signal processing, for example as specific hardware components, for example in application-specific integrated circuits (ASICs) or field-programmable gate arrays (FPGAs), or can also be implemented by programming a processor device such as a microcontroller or a digital signal processor.

A difference between the angle thus determined and an output, that is to say a counter reading, from a counter 15 is then calculated in a difference calculation device 13. As will be explained more specifically later, the counter reading of the counter 15 likewise represents an angular position of the rotatable object 16. The difference that is output by the subtracter 13 thus denotes a discrepancy between the angle as represented by the counter reading of the counter 15 and the angle that is determined directly based on the measurement by the sensors 10.

This difference is taken as a basis for controlling, i.e. incrementing or decrementing, the counter 15. To this end, the difference can be taken as a basis for determining an angular velocity vo of the object 16 in a velocity determination device 14, for example by integrating the difference or more generally by filtering the difference, for example by means of a PI (proportional-integral) controller. The counter 15 is then controlled in accordance with the velocity vo, that is to say is incremented more quickly for higher velocities and is incremented more slowly for lower velocities (or decremented if the direction of rotation of the rotatable object 16 is the reverse).

The counter 15 in this case is a counter that counts from zero to a maximum counter reading and then returns to zero, or jumps to the maximum counter reading if the zero is undershot (as a result of decrementation). The zero of the counter can correspond to an angle of 0° of the rotatable object 16, and the values up to the maximum value of the counter then correspond to values 0-360°, the latter in turn corresponding to 0°. If the counter is a 12-bit counter, for example, it is possible to represent 4096 different values ($2^{12}$), i.e. from 0-4095. Any incrementation of the counter by a least significant bit would correspond to an angle change of 360°/4096=0.0879°. The counter value is then output as the angular position po, the counter value either being able to be output directly or also being able to be converted into degrees or a different angle unit, for example. The angular position po can be output using any desired protocol in this case.

For the difference calculation in the difference calculation device 13 too, it is noted that the angle determined by the angle determination device 12 is determined on the same scale as the output from the counter 15. In the aforementioned example of a 12-bit counter, the angle determination device 12 can also determine the angle as a 12-bit-value value, for example, or the bit length of the counter 15 can be decreased in the difference calculation device 13 to a bit length of an output from the angle determination device 12 if this is shorter.

The feedback loop to the subtracter 13 synchronizes the counter reading with the angle determination by the sensors 10. In some example implementations, the analog-to-digital converter arrangement 11 can have a lower resolution than the counter 15. By way of example, the analog-to-digital converter arrangement 11 can output digital signals with a resolution of 6 bits, whereas the counter 15 is a 12-bit counter. Using the counter 15 and the synchronization by way of the feedback to the difference calculation device 13 ultimately allows the angle po to be output with a higher resolution, i.e. higher accuracy, than the resolution of the analog-to-digital converter arrangement 11. The comparatively lower resolution of the analog-to-digital converter arrangement allows a correspondingly higher clock frequency to be used, with the result that the angle sensor arrangement shown allows a high resolution, i.e. high accuracy, of the angle for a simultaneously high update rate.

More detailed example implementations of the principle shown with reference to FIG. 1 will now be explained with reference to FIGS. 2A, 2B, 3 and 4.

To avoid repetition, identical or mutually corresponding elements in FIGS. 2A, 2B, 3 and 4 bear the same reference signs and are therefore not explained repetitiously.

Figure 2A:
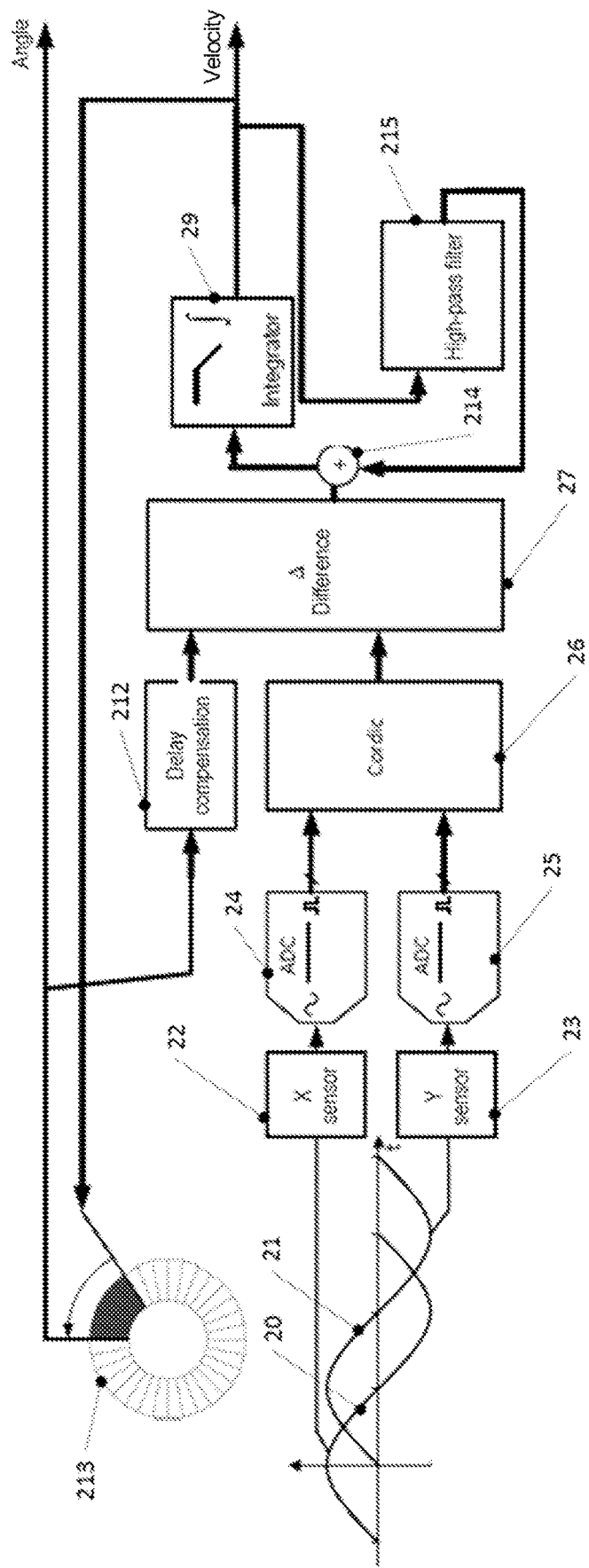
FIGS. 2A and 2B show block diagrams of angle sensor apparatuses according to further example implementations.

FIG. 2A shows a more detailed block diagram of an angle sensor apparatus according to a further example implementation. The angle sensor apparatus of FIG. 2A has two sensors 22 and 23, of which the sensor 22 is referred to as the X sensor and the sensor 23 is referred to as the Y sensor. The sensors 22, 23 can have respective sensitivity axes, for example, i.e. they are sensitive to magnetic field components parallel to the respective sensitivity axes. The sensitivity axis of the sensor 22 is perpendicular to the sensitivity axis 23, for example in an X direction and a Y direction of a right-angled coordinate system, the axis of rotation of a rotatable object (not shown in FIG. 2A, see rotatable object 16 of FIG. 1) being able to be the Z axis, for example. Rotation at constant velocity can then result in the sensor 22 outputting a cosine-shaped measurement signal 20, and the sensor 23 can output a sinusoidal measurement signal 21. In other words, the measurement signals that are output by the sensors 22, 23 have been phase-shifted through 90° in the case of such an arrangement.

The measurement signal from the sensor 22 is digitized by an analog-to-digital converter 24, and the measurement signal from the sensor 23 is digitized by an analog-to-digital converter 25. The analog-to-digital converters 24 and 25 may each be sigma-delta analog-to-digital converters.

The further components described are accordingly digital components, which may be implemented as described above for the digital components of FIG. 1.

Based on the outputs from the analog-to-digital converters 24, 25, a Cordic algorithm 26 computes an angular position. A difference calculation device 27 calculates the difference between this angular position and the output po from a counter 213. The counter 213 is an overflow and underflow counter, as already described for the counter 15, this being symbolized in FIG. 2A by a circular shape of the counter.

The output from the counter 213 is supplied to the difference calculation device 27 via a delay compensation unit 212 in order to compensate for a delay that results from the signal chain formed from the sensors 22, 23, the analog-to-digital converters 24, 25, the Cordic algorithm 26 and the filter components described below (in the example implementation of FIG. 1, a delay of at least some of the components 10 to 14 could be compensated for in this way).

As already explained for the counter 15 of FIG. 1, the output from the counter 213 indicates an angular position. The delay compensation unit 212 ensures that the difference between angular positions that correspond to one another in time, in one instance output by the counter 213 and in another instance measured by means of the sensors 22, 23, is calculated. This in turn ensures that the counter reading of the counter 213 always indicates an instantaneous angular position. Moreover, the delay compensation unit can compensate for a delay by a data transmission protocol (e.g., to form the protocol) that is used by the sensors 22, 23 and/or to form the signal po. It is also possible to take account of delays for receiving the signals output by the apparatus of FIG. 2A in a further apparatus, for example a microprocessor, if these are known. The delay compensation unit 212 can be formed for example by a low-pass filter and/or a digital IIR filter. The delay can be at least two periods of a clock signal used for operating the analog-to-digital converters 24, 25 and the Cordic algorithm 26, e.g., more than 5 periods, for example approximately 10 periods.

In the example implementation of FIG. 2A, the velocity, i.e. angular velocity, is determined based on an output from the difference calculation device. To this end, the example implementation of FIG. 2A has an integrator 29, for example a first-order integrator, and feedback via a high-pass filter 215 to an adder 214. The high-pass-filtered velocity is essentially the angular acceleration.

The filter arrangement of FIG. 2A should be understood as a simple example, and other filter arrangements are also possible. By way of example, multiple integrators can be used. The greater the number of integrators, the greater the order of the compensation ultimately achievable by way of the difference calculation and feedback, i.e. compensation for discrepancies between the counter and the position actually detected by the sensor.

If no integrators are present, it is possible to compensate for the position, with one integrator it is additionally possible to compensate for the velocity, with two integrators it is additionally possible to compensate for a constant acceleration, with three integrators it is additionally possible to compensate for a linearly increasing acceleration, with 4 integrators it is additionally possible to compensate for a quadratically increasing acceleration, etc.

Figure 2B:
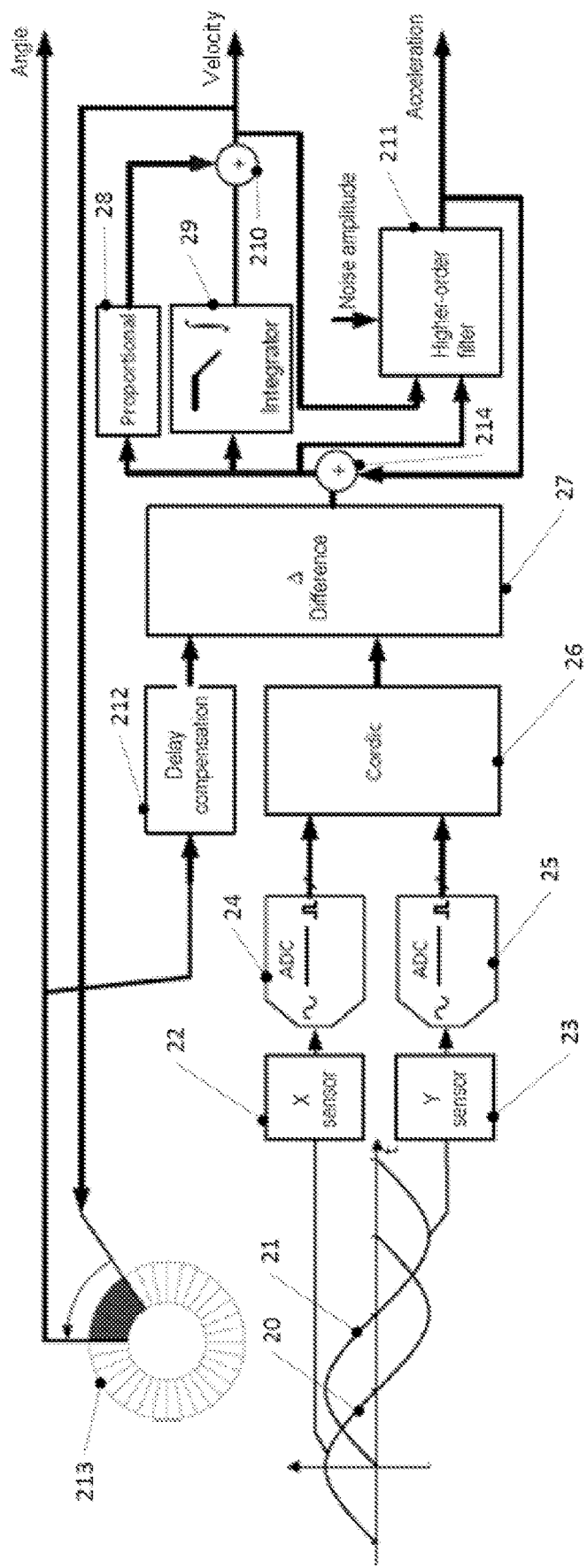

FIG. 2B shows a variation of FIG. 2A with a different filter arrangement. Except for the filter arrangement, FIG. 2A matches FIG. 2B, and the matching components are not described again.

In FIG. 2B, the acceleration, i.e. angular acceleration, is additionally output. In the example of FIG. 2B, a PI (proportional-integral) filter having a proportional component 28 and the integrator 29, which are added in an adder 210, is essentially used to determine the velocity. The proportional component is used in particular to stabilize the feedback loop, including the counter 213, and can also be provided in the example implementation of FIG. 2A.

The acceleration is essentially determined by means of a higher-order filter 211, which can also take account of a noise amplitude. Filter coefficients of the filter 211 can be influenced by noise measurements or signal hops, in order to allow an adaptive behavior that is dependent on the signal supplied to the filter 211. As such, the filter coefficients can be chosen in such a manner that large signal hops (for example caused by a suddenly occurring high angular acceleration) that go beyond previously measured noise result in a faster response being made possible, i.e. the output from the apparatuses shown can thus follow such signal hops more quickly. The higher-order filter 211 can be a second- to fourth-order filter, for example, and can also include compensation for nonlinearities. Such nonlinearities can lead to high and fast signal hops being followed by a disproportionately more powerful filter response than slow and small signal hops. Such behavior can be compensated for at least in part. As in FIG. 2A, the acceleration can be fed back to the adder 214 at the output of the difference calculation device 27. In some example implementations, a higher-order filter can be used to process changing accelerations better.

The counter 213 both in FIG. 2A and in FIG. 2B is incremented (or decremented) based on the velocity, as likewise explained with reference to FIG. 1. The feedback of the counter reading to the difference calculation device 27 synchronizes the counter to the angular position that is actually measured by means of the sensors 22, 23. As is likewise explained, the counter 213 can have a higher resolution than the analog-to-digital converters 24, 25. Moreover, the angle can be read from the counter 213 with lower latency than the determination by the sensors 22, the analog-to-digital converters 24, 25 and the Cordic algorithm 26, this being achieved by way of the delay compensation 212, in particular, as already explained above.

The text below also provides some numerical examples of the dimensioning of various components of the apparatus of FIGS. 2A and 2B. These numerical examples are used merely for illustrative purposes and are dependent on the dimensioning of the components.

The analog-to-digital converters 24 and 25 can be time-continuous or chopped sigma-delta analog-to-digital converters operating for example at a frequency of 10 MHz and with a bit length of 6 bits. The Cordic algorithm 26 can be in the form of a 6-bit pipeline Cordic with a corresponding input frequency of 10 MHz and a processing frequency of FDEG=40 MHz. A delay resulting from such a Cordic algorithm can be in the region of 600 ns.

The difference signal that is output by the difference calculation device 27 can likewise be a 6-bit signal at 10 MHz. As a result of the filtering, the velocity signal can then have a resolution of 12 bits, likewise at 10 MHz. The counter 213 can be a 12-bit counter, for example, but can also have more bits, for example can be a 16-bit counter. The integrator 29 can be a first-order integrator, but can also be a higher-order integrator.

Figure 3:
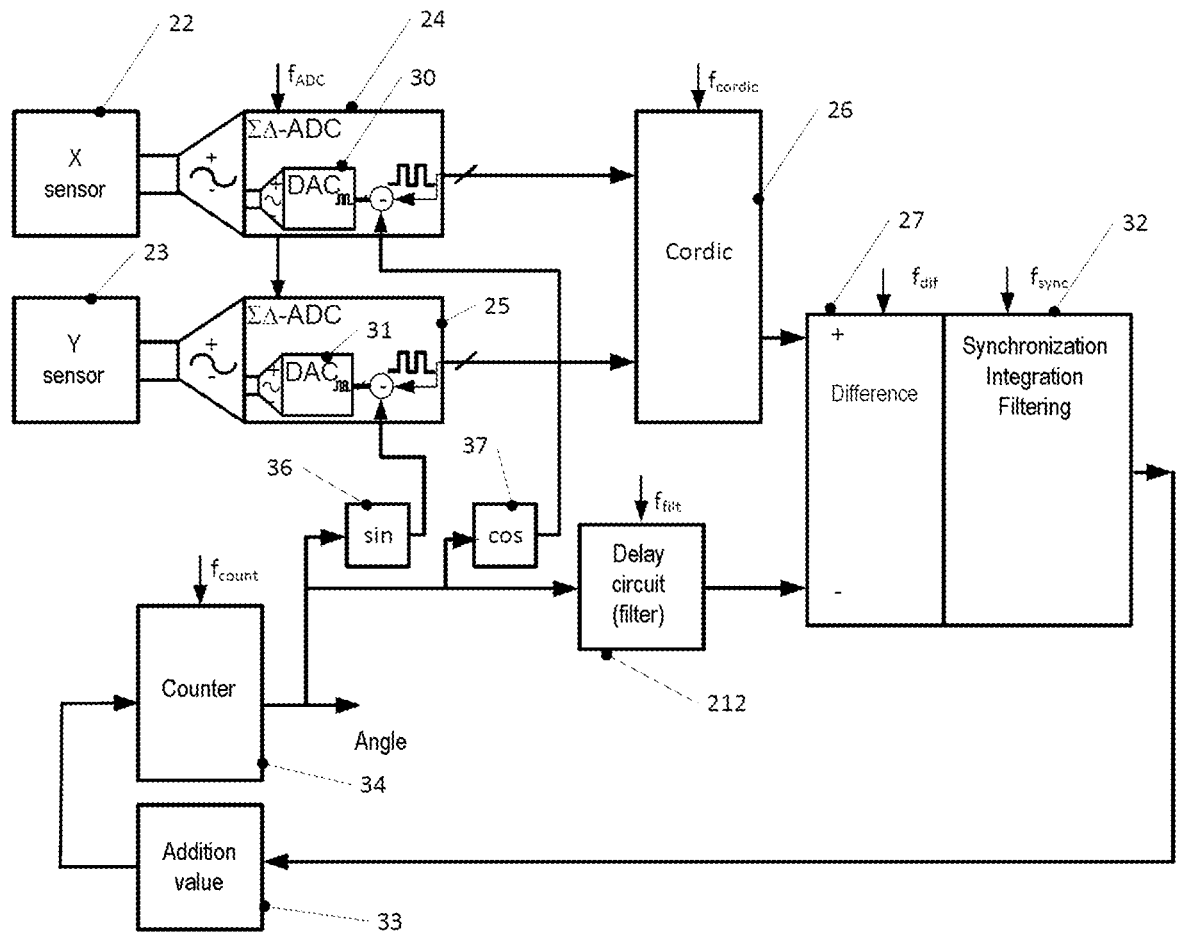
FIG. 3 shows a block diagram of an angle sensor apparatus according to a further example implementation.

FIG. 3 shows a variation of FIGS. 2A and 2B. The different filter functions connected downstream of the difference calculation device 27, which have been explained with reference to FIGS. 2A and 2B (components 28-211 and 214), are combined as a synchronization/integration/filtering device 32, which operates at a frequency $f_{sync}$ and outputs an addition value 33 that is supplied to a counter 34, which corresponds to the counter 213 of FIGS. 2A and 2B. In some example implementations, negative feedback from the output of the counter to the input thereof can also be provided.

Moreover, feedback to the analog-to-digital converters 24, 25 is also provided in FIG. 3. The analog-to-digital converters 24, 25 in this case are each shown as a sigma-delta analog-to-digital converter containing a feedback digital-to-analog converter (DAC) 30 or 31. Shown at the input of each of the digital-to-analog converters 30 and 31 is an adder that is used to additionally apply a feedback signal from the counter 34 to the respective digital-to-analog converter 30 or 31. In particular, a cosine component of the angle that is output by the counter 34 is applied to the digital-to-analog converter 30 as shown by a block 37, and a sine component is applied to the digital-to-analog converter 31 as per block 36. In practice, this sine component and cosine component are a "back-conversion" of the Cordic algorithm 26, i.e. a sinusoidal and a cosine-shaped signal similar to the signals 20, 21 of FIG. 2 are again generated from the angle. This can be done by means of a lookup table, for example. Instead of the depicted feedback to the digital-to-analog converters 30 and 31, it is also possible for an output or input of the analog-to-digital converters 24, 25 to be additively or multiplicatively overlaid with an applicable feedback signal. In this way too, the ultimate output from the analog-to-digital converters 24, 25 can be modified in accordance with the feedback shown.

The effect of this feedback is that essentially only the acceleration is quantified by the analog-to-digital converters 24, 25 (if necessary after the feedback signal has been overlaid at the output, i.e. when the thus modified signal is considered), i.e. a change in the velocity. In other words, the output from the analog-to-digital converters then reacts essentially only to the difference in sinusoidal signals (the sensor signal and the feedback signal) and therefore to accelerations. This can reduce errors.

Figure 4:
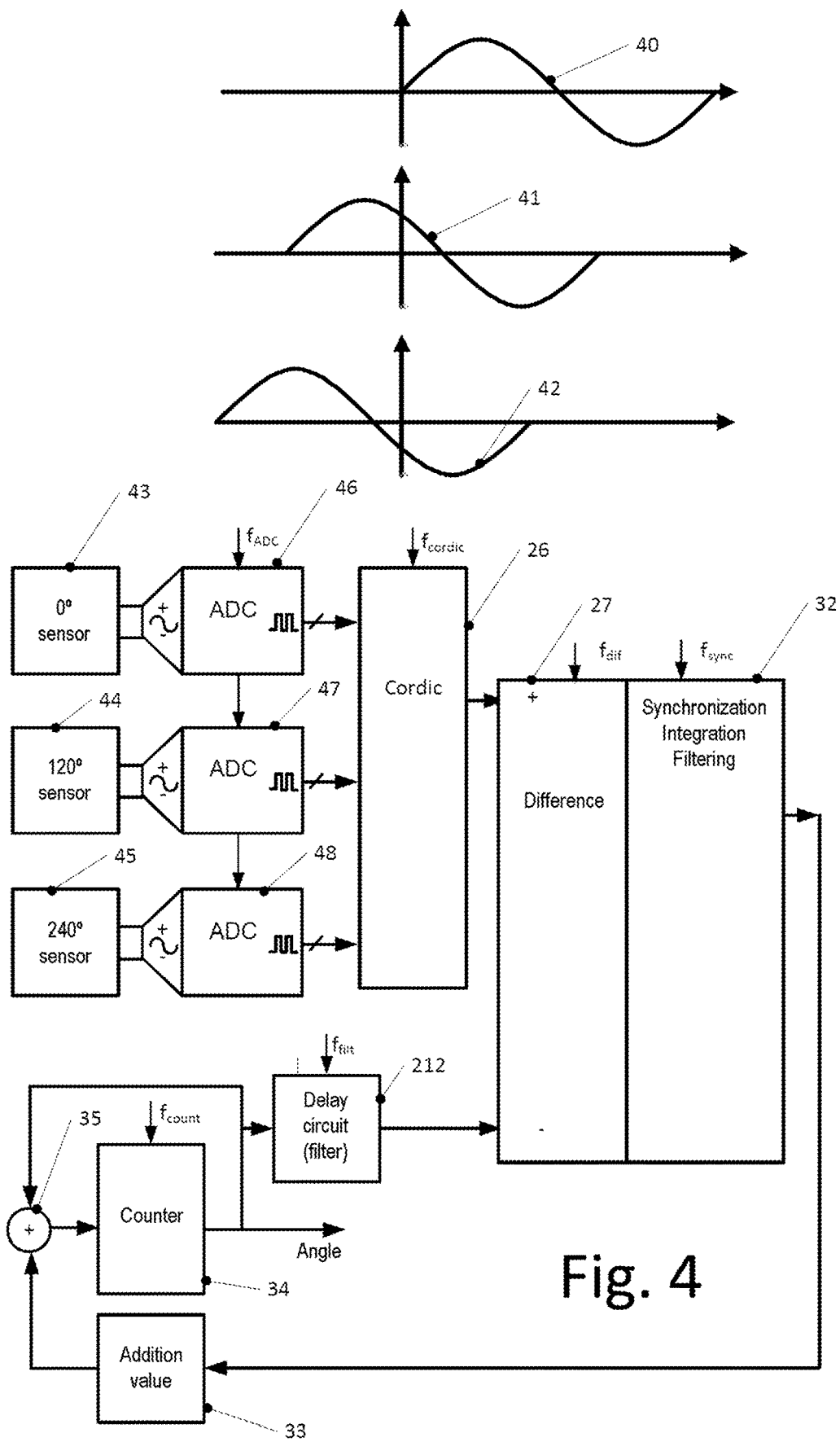
FIG. 4 shows a block diagram of an angle sensor apparatus according to a further example implementation.

A further variant is shown in FIG. 4. In the example implementation of FIG. 4, instead of two sensors, three sensors 43, 44, 45 having corresponding downstream analog-to-digital converters 46, 47 and 48 are provided. The sensors 43, 44 and 45 are provided in such a manner that they detect three measurement signals, each shifted through 120°, as represented by signals 40-42 in FIG. 4. By way of example, the sensor 43, also referred to as the 0° sensor, detects a cosine-shaped signal 40, the sensor 44, also referred to as the 120° sensor, detects a signal 41 shifted through 120° with respect thereto, and the sensor 45, referred to as the 240° sensor here, detects a signal 42, which has again been shifted through 120° with respect to the signal 41 and therefore has been shifted through 240° with respect to the signal 40. The Cordic algorithm 26 is then accordingly adjusted in order to compute the angle based on the outputs from the analog-to-digital converters 46, 47 and 48.

In contrast to FIG. 3, FIG. 4 provides no feedback in accordance with blocks 36, 37. In other implementations, appropriate feedback can be provided, this then feeding back 3 components shifted through 120° with respect to one another to the respective analog-to-digital converters instead of sinusoidal and cosine-shaped components as in FIG. 3.

Figure 5:
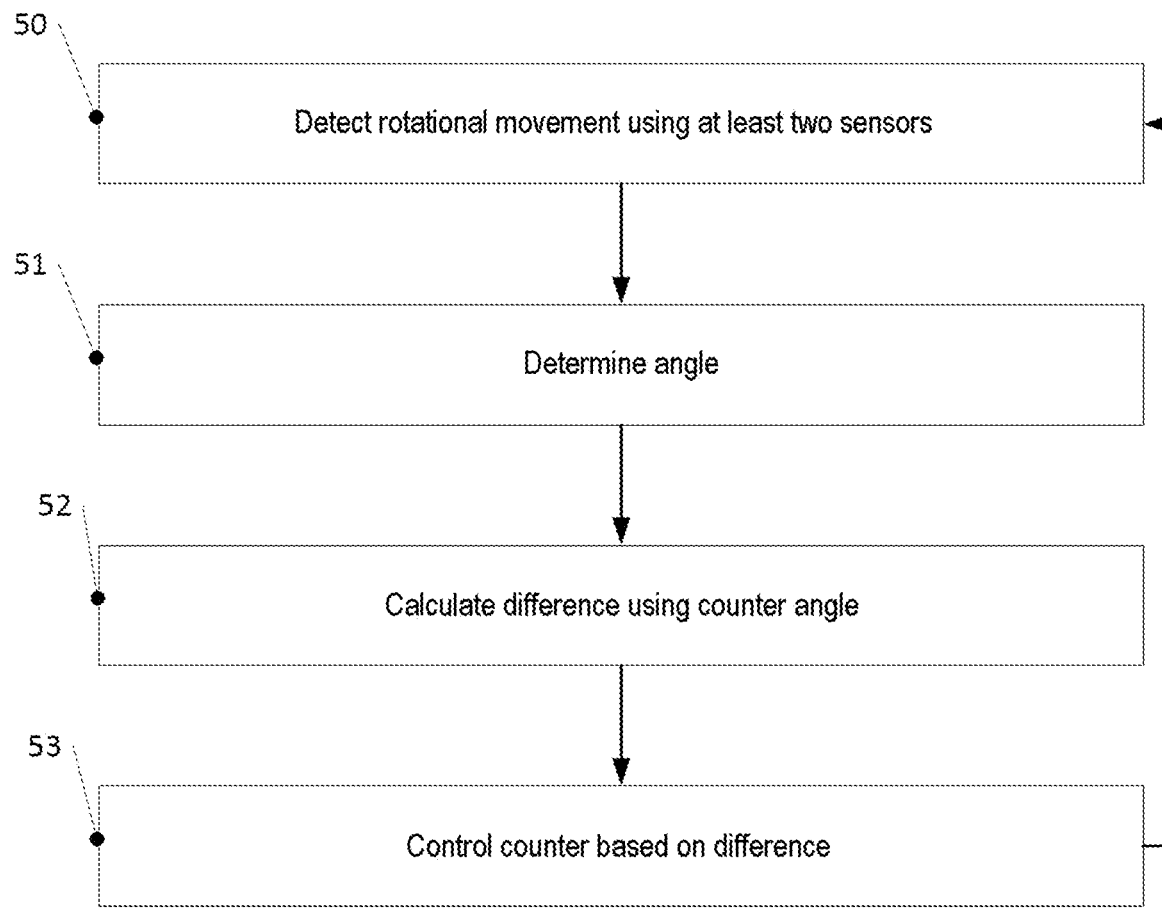
FIG. 5 shows a flowchart to illustrate a method according to some example implementations.

FIG. 5 shows a flowchart for a method according to one example implementation. The method of FIG. 5 can be carried out for example using the angle sensor apparatuses explained with reference to FIGS. 1-4, or in other appropriately configured angle sensor apparatuses. Variations and adaptations discussed for the apparatuses can also be applied to the method of FIG. 5 and are not explained more specifically separately. Moreover, to avoid repetition, the method of FIG. 5 is explained with reference to the above description of the apparatuses.

At 50, the method comprises detecting a rotational movement using at least 2 sensors, such as for example the sensors 22, 23, or the sensors 43, 44 and 45.

At 51, the method comprises determining an angle based on measurement signals that are output by the sensors, for example by way of a Cordic algorithm such as the Cordic algorithm 26.

At 52, the method comprises calculating a difference between the angle determined at 51 and a counter angle, i.e. an angle as displayed by a counter such as for example the counter 213 or 34. At 53, the method comprises controlling, i.e. incrementing or decrementing, the counter based on the difference, for example using the filters described. As indicated by an arrow from 53 to 50, this method is carried out continuously, in accordance with the described manner of operation of the apparatuses.

ASPECTS

Some example implementations are defined by the following aspects.

Aspect 1. Angle sensor apparatus, comprising:
a sensor device that is configured to respond to a rotational movement of a rotatable object by providing at least two phase-shifted measurement signals,
an angle determination device that is configured to take the at least two measurement signals as a basis for determining an angular position of the rotatable object,
a difference calculation device that is configured to determine a difference between the angular position determined by the angle determination device and an output from a counter,
the counter being configured to be controlled based on the difference.

Aspect 2. Angle sensor apparatus according to aspect 1, further comprising a delay device between the counter and the difference calculation device, a delay of the delay device being chosen in such a manner that it levels out at least delays of the sensor device, the angle determination device and/or the difference calculation device.

Aspect 3. Angle sensor apparatus according to aspect 1 or 2, further comprising an analog-to-digital converter arrangement that is configured to digitize the measurement signals and to provide the angle determination device with digitized measurement signals.

Aspect 4. Angle sensor apparatus according to aspect 3, wherein the analog-to-digital converter arrangement has a lower bit resolution than the counter.

Aspect 5. Angle sensor apparatus according to aspect 3 or 4, further comprising feedback from the counter to the analog-to-digital converter arrangement in such a manner that the analog-to-digital converter arrangement essentially quantifies an acceleration of the rotatable object.

Aspect 6. Angle sensor apparatus according to aspect 5, wherein the feedback is applied to a feedback digital-to-analog converter of the analog-to-digital converter device.

Aspect 7. Angle sensor apparatus according to aspect 5, wherein the feedback is configured to overlay a digital feedback signal on an output from the analog-to-digital converter arrangement.

Aspect 8. Angle sensor apparatus according to one of aspects 5-7, wherein the feedback comprises a lookup table that generates a reconstructed measurement signal from the output from the counter.

Aspect 9. Angle sensor apparatus according to one of aspects 1-8, wherein the sensor device comprises
two sensors that are configured to output measurement signals phase-shifted through 90° with respect to one another, or
three sensors that are configured to output measurement signals progressively phase-shifted through 120° with respect to one another.

Aspect 10. Angle sensor apparatus according to one of aspects 1-9, further comprising a velocity determination device that is configured to take the difference as a basis for determining an angular velocity of the rotatable object, the counter being configured to be incremented or decremented based on the angular velocity.

Aspect 11. Angle sensor apparatus according to aspect 10, wherein the velocity determination device comprises one or more integrators.

Aspect 12. Angle sensor apparatus according to aspect 11, wherein the velocity determination device comprises a proportional component in parallel with the one or more integrators.

Aspect 13. Angle sensor apparatus according to one of aspects 10-12, wherein the velocity determination device comprises a filter for determining an angular acceleration.

Aspect 14. Method, comprising:
detecting a rotational movement of a rotatable object and generating at least two phase-shifted measurement signals in response to the rotational movement,
determining an angular position based on the at least two phase-shifted measurement signals,
calculating a difference between the determined angular position and an output from a counter, and
controlling the counter based on the difference.

Aspect 15. Method according to aspect 14, wherein before the difference between the angular position and an output from a counter is calculated the output from the counter is delayed in such a manner that at least delays of the detection, the determination of the angular position and/or the calculation of the difference are leveled out.

Aspect 16. Method according to aspect 14 or 15, further comprising converting the measurement signals into digital signals, the determination of the angular position being based on the digital signals.

Aspect 17. Method according to aspect 16, wherein conversion is performed using a lower bit resolution than a bit resolution of the counter.

Aspect 18. Method according to aspect 16 or 17, wherein the conversion is performed based on feedback from the counter in such a manner that the conversion essentially quantifies an acceleration of the rotatable object.

Aspect 19. Method according to one of aspects 14-18, further comprising determining an angular velocity of the rotatable object based on the difference, the control of the counter comprising incrementing or decrementing the counter based on the angular velocity.

Although specific aspect implementations have been illustrated and described in this description, persons who have routine knowledge in the art will recognize that a multiplicity of alternative and/or equivalent implementations can be chosen as substitution for the specific aspect implementations shown and described in this description, without departing from the scope of the implementation shown. The intention is for this application to cover all adaptations or variations of the specific aspect implementations discussed here. Therefore, the intention is for this implementation to be restricted only by the claims and the equivalents of the claims.

What is claimed is:
1. An angle sensor apparatus, comprising:
a sensor device that is configured to respond to a rotational movement of a rotatable object by providing at least two phase-shifted measurement signals,
an angle determination device that is configured to take the at least two phase-shifted measurement signals as a basis for determining an angular position of the rotatable object, and
a difference calculation device that is configured to determine a difference between the angular position determined by the angle determination device and an output from a counter,
the counter being configured to be controlled based on the difference between the angular position determined by the angle determination device and the output from the counter.

2. The angle sensor apparatus as claimed in claim 1, further comprising:
a delay device between the counter and the difference calculation device, a delay of the delay device being chosen in such a manner that delay levels out at least one or more of delays of the sensor device, the angle determination device, or the difference calculation device.

3. The angle sensor apparatus as claimed in claim 1, further comprising:
an analog-to-digital converter arrangement that is configured to digitize the at least two phase-shifted measurement signals and to provide the angle determination device with digitized measurement signals.

4. The angle sensor apparatus as claimed in claim 3, wherein the analog-to-digital converter arrangement has a lower bit resolution relative to a bit resolution of the counter.

5. The angle sensor apparatus as claimed in claim 3, further comprising:
feedback from the counter to the analog-to-digital converter arrangement in such a manner that the analog-to-digital converter arrangement essentially quantifies an acceleration of the rotatable object.

6. The angle sensor apparatus as claimed in claim 5, wherein the feedback is applied to a feedback digital-to-analog converter of the analog-to-digital converter arrangement.

7. The angle sensor apparatus as claimed in claim 5, wherein the feedback is configured to overlay a digital feedback signal on an output from the analog-to-digital converter arrangement.

8. The angle sensor apparatus as claimed in claim 5, wherein the feedback comprises a lookup table that generates a reconstructed measurement signal from the output from the counter.

9. The angle sensor apparatus as claimed in claim 1, wherein the sensor device comprises:
two sensors that are configured to output measurement signals phase-shifted through 90° with respect to one another, or
three sensors that are configured to output measurement signals progressively phase-shifted through 120° with respect to one another.

10. The angle sensor apparatus as claimed in claim 1, further comprising:
a velocity determination device that is configured to take the difference as a basis for determining an angular velocity of the rotatable object, the counter being configured to be incremented or decremented based on the angular velocity.

11. The angle sensor apparatus as claimed in claim 10, wherein the velocity determination device comprises one or more integrators.

12. The angle sensor apparatus as claimed in claim 11, wherein the velocity determination device comprises a proportional component in parallel with the one or more integrators.

13. The angle sensor apparatus as claimed in claim 10, wherein the velocity determination device comprises a filter for determining an angular acceleration.

14. A method, comprising:
detecting a rotational movement of a rotatable object and generating at least two phase-shifted measurement signals in response to the rotational movement,
determining an angular position based on the at least two phase-shifted measurement signals,
calculating a difference between the determined angular position and an output from a counter, and
controlling the counter based on the difference between the determined angular position and the output from the counter.

15. The method as claimed in claim 14, wherein before the difference between the angular position and the output from the counter is calculated, the output from the counter is delayed in such a manner that at least one or more of delays of detecting the rotational movement, the determining the angular position, or the calculating the difference are leveled out.

16. The method as claimed in claim 14, further comprising:
converting the at least two phase-shifted measurement signals into digital signals, the determining the angular position being based on the digital signals.

17. The method as claimed in claim 16, wherein converting the at least two phase-shifted measurement signals into the digital signals is performed using a lower bit resolution relative to a bit resolution of the counter.

18. The method as claimed in claim 16, wherein the converting the at least two phase-shifted measurement signals into the digital signals is performed based on feedback from the counter in such a manner that a conversion essentially quantifies an acceleration of the rotatable object.

19. The method as claimed in claim 14, further comprising:
determining an angular velocity of the rotatable object based on the difference, the controlling the counter comprising incrementing or decrementing the counter based on the angular velocity.

* * * * *